United States Patent
Catthoor et al.

(10) Patent No.: US 10,073,802 B2
(45) Date of Patent: Sep. 11, 2018

(54) INTER-CLUSTER DATA COMMUNICATION NETWORK FOR A DYNAMIC SHARED COMMUNICATION PLATFORM

(71) Applicants: IMEC VZW, Leuven (BE); Stichting IMEC Nederland, Eindhoven (NL)

(72) Inventors: Francky Catthoor, Temse (BE); Praveen Raghavan, Leefdaal (BE)

(73) Assignees: IMEC VZW, Leuven (BE); Stichting IMEC Nederland, Eindhoven (NL)

( * ) Notice: Subject to any disclaimer, the term of this patent is extended or adjusted under 35 U.S.C. 154(b) by 178 days.

(21) Appl. No.: 15/250,067

(22) Filed: Aug. 29, 2016

(65) Prior Publication Data

US 2017/0083469 A1    Mar. 23, 2017

(30) Foreign Application Priority Data

Sep. 18, 2015   (EP) .................................... 15185798

(51) Int. Cl.
| | |
|---|---|
| G06F 13/40 | (2006.01) |
| G06F 13/42 | (2006.01) |
| G06F 15/173 | (2006.01) |
| G06F 15/78 | (2006.01) |

(52) U.S. Cl.
CPC ...... *G06F 13/4022* (2013.01); *G06F 13/4282* (2013.01); *G06F 15/17362* (2013.01); *G06F 15/7807* (2013.01)

(58) Field of Classification Search
None
See application file for complete search history.

(56) References Cited

U.S. PATENT DOCUMENTS

| | | |
|---|---|---|
| 5,649,106 A | 7/1997 | Tsujimichi et al. |
| 2006/0095710 A1 | 5/2006 | Pires Dos Reis Moreira et al. |
| 2015/0058268 A1 | 2/2015 | Modha |

FOREIGN PATENT DOCUMENTS

| | | |
|---|---|---|
| EP | 1 958 059 B1 | 11/2009 |
| EP | 2 685 395 A1 | 1/2014 |

OTHER PUBLICATIONS

European Search Report, European Patent Application No. 15185798.4, dated Apr. 15, 2016, 8 pages.

(Continued)

*Primary Examiner* — Idriss N Alrobaye
*Assistant Examiner* — Dayton Lewis-Taylor
(74) *Attorney, Agent, or Firm* — McDonnell Boehnen Hulbert & Berghoff LLP

(57) ABSTRACT

The disclosure relates to a data communication network connecting a plurality of computation clusters. The data communication network is arranged for receiving via N data input ports, N>1, input signals from first clusters of the plurality and for outputting output signals to second clusters of the plurality via M data output ports, M>1. The communication network includes a segmented bus network for interconnecting clusters of the plurality and a controller arranged for concurrently activating up to P parallel data busses of the segmented bus network, thereby forming bidirectional parallel interconnections between P of the N inputs, P<N, and P of the M outputs, P<M, via paths of connected and activated segments of the segmented bus network. The segments are linked by segmentation switches. The N data input ports and the M data output ports are connected via stubs to a subset of the segmentation switches.

20 Claims, 9 Drawing Sheets

(56) References Cited

OTHER PUBLICATIONS

Guo, Jin et al., "Physical Design Implementation of Segmented Buses to Reduce Communication Energy", Design Automation, Asia and South Pacific Conference, Jan. 24, 2006, pp. 42-47.
Moradi, Saber et al., "A Memory-Efficient Routing Method for Large-Scale Spiking Neural Networks", European Conference on Circuit Theory and Design, Sep. 2013, 4 pages.
Heyrman, K. et al., "Control for Power Gating of Wires", IEEE Trans. on VLSI Systems, vol. 18, No. 9, Sep. 2010, pp. 1287-1300.
Leroy, Anthony et al., "Concepts and Implementation of Spatial Division Multiplexing of Guaranteed Throughout in Networks-on-Chip", IEEE Transactions on Computers, vol. 57, No. 9, Sep. 2008, pp. 1182-1195.
Gheorghita, S.V. et al., "System Scenario Based Design of Dynamic Embedded Systems", ACM Trans. On Design Automation of Electronic Systems (TODAES), vol. 14, No. 1, Article 3, Jan. 2009, pp. 1-44.
Catthoor, Francky et al., "Integrated Circuit With Low Power Consumption for Point-to-Two-Point Signal Communication", European Patent Application EP15167580 filed May 13, 2015, 27 pages.

INTER-CLUSTER DATA COMMUNICATION NETWORK FOR A DYNAMIC SHARED COMMUNICATION PLATFORM

CROSS-REFERENCE TO RELATED APPLICATIONS

The present application is a non-provisional patent application claiming priority to European Patent Application No. EP 15185798.4, filed Sep. 18, 2015, the contents of which are hereby incorporated by reference.

FIELD OF THE DISCLOSURE

The present disclosure relates to the field of inter-cluster communication in a fully dynamic shared communication network.

BACKGROUND

The present disclosure considers the context of inter-cluster communication in a multi-core System-on-Chip (SoC) where the clusters are the processing cores (including their local $L_1$ memories) and the shared higher-layer memories on the SoC.

Current SoCs contain many different processing cores that communicate with each other and with the many distributed memories in the layered background memory organization through an intra- and inter-tile communication network. Tiles are formed by a group of tightly connected cores (processors), i.e. cores between which the activity exceeds a certain threshold level. One important design feature of the SoCs relates to the length of the interconnections between the clusters. State-of-the-art solutions have relatively long connections that need to be nearly continuously powered up and down, reaching from the ports of the data producers/consumers (inside the tiles or between different tiles) up to the ports of the communication switches. The present-day SoC inter-tile communication networks are based on different types of busses (shared or not) and networks-on-chip (NoC).

An application field is that of neuromorphic systems. Neuromorphic systems, also referred to as artificial neural networks, are computational systems so configured that electronic systems wherein they are provided, can essentially function in a manner that more or less imitates the behavior of networks of biological neurons. Neuromorphic computation does not generally utilize the traditional digital model of manipulating zeros and ones. In order to allow communication between potentially strongly connected neurons in such neural networks, connections are created between processing elements which are roughly functionally equivalent to neurons of a biological brain. Neuromorphic computation may comprise various electronic circuits that are modelled on biological neurons and synapses. Typically multi-layer neural networks are used, with one or more hidden layers (or in general intermediate layers if non-standard neural network topologies would be used). Some well-known examples include perceptrons, convolutional neural networks (CNNs), asynchronous conceptors, restricted Boltzmann machines (RBMs) and deep-learning neural networks (DNNs). In all of these, synaptic plasticity/adaptation is crucial. They can use synchronous or asynchronous signaling protocols. Because of the strong resemblance to how a human brain works, the asynchronous spike-timing-dependent plasticity (STDP) spiking protocol is very popular in the neuromorphic community. Neuron layers in principle should be "fully" connected with one another to allow all connection flexibility, which leads to a densely connected neural array, for example with $N_1 \times N_1$ synapses for $N_1$ neurons in the input layer and $N_1$ neurons in the output layer of the stage. However, typically also at least one so-called hidden neuron layer is present with $K_1$ neurons. In general it can also be $N_1 \times K_1 \times M_1$, as shown in FIG. 1, when $M_1$ neurons are present in the output layer. However, typically also at least one so-called hidden neuron layer is also present with $K_1$ neurons. Across stages the neuron layers also need to communicate, but not all connections then need to be present, so no full crossbar is then needed any more. That is partly the case already between the input and output layer when also a hidden layer is present (see FIG. 1 where not all possible connections are realizable between the $N_1$ input neurons and $M_1$ output neurons, except when $K_1 = N_1 \times M_1$, which would lead to too much cost overhead). That is especially so when several clusters of densely connected neural arrays (in the literature also referred to as stages) are communicating with each other (see FIG. 2 where two clusters are shown with their mutual $L_1$ connections that form a subset of all possible connections). However, upfront at fabrication time it is not known which specific neuron connections (which of the $L_1$ connections in FIG. 2) are needed later. Moreover, building a neuromorphic system comprising only one single dense neural cluster clearly does not scale in terms of connections. Hence, there clearly is a big challenge in finding the best global synapse connection approach across the clusters, supported with an appropriately matched communication network architecture.

Many research projects have initiated and expanded the neuromorphic computing domain. Many of those initiatives are focused on one aspect of the system and do not cover the overall scheme. They mostly address the dense local synapse array using traditional SRAMs or emerging non-volatile memories like phase-change memory (PCM), resistive RAM (ReRAM) or STT-MRAM. In IBM's TrueNorth initiative and in the Human Brain Project the overall scheme is addressed but they use more conventional technology, namely CMOS logic and SRAM/DRAM memories.

Looking more into detail at the global synapse communication problem, as formulated above, there is also a need for scalable solutions which also provide a broad applicability.

A similar observation can be made for inter-core communication networks in SoCs.

Some alternate approaches to solve the global inter-cluster communication bottleneck with low energy while still covering a (very) wide application range, are now discussed with more technical details. Existing solutions can roughly be divided into a number of categories.

A first set of solutions is characterized by a restricted connectivity. Rather regular locally connected architectures are usually used in this approach, similar to systolic arrays. Two main options are available for time-multiplexing: Local Sequential Global Parallel (LSGP) or the opposite (LPGS). Initially these are formulated for a single stage, but this can be generalized to multiple stages. A main trade-off exists in these solutions in the local storage vs bandwidth requirement. N nodes are assumed with $\sqrt{N}$ parallel nodes that are time-multiplexed with a time-multiplexing factor $\sqrt{N}$. Then LSGP has N data stored and $4\sqrt{N}$ transfers. LPGS has $\sqrt{N}$ data stored and 4N transfers. The LSGP can provide a better match to the back-end-of-line (BEOL) capacitance and architecture bandwidth bottlenecks. However, this is still not so attractive because the targeted classes of applications/ algorithms then have to be (too) heavily restricted. The Spinnaker project of the University of Manchester is e.g. mostly based on this with heavy time multiplexing, restricting global data connections.

In a second category of alternate solutions full connectivity is maintained. Both LSGP and LPGS then require $N(N-1)=N^2$ data transfers, which is not scalable to brain-like dimensions with at least $10^{10}$ neurons. A human brain has a reduction from $N^2=10^{20}$ to $10^{15}$ synapses and these are still mostly inactive for a large part of the instantiated processing. Some projects still try to scale up in this way, including strong time-multiplexing. To implement hidden layers more effectively, it is then best to use LPGS where the highly dynamic global connectivity can be exploited in a flexible time-multiplexed software-enabled way. Intra neural cluster connection is more "static", so it is most suitable to link that to the spatially parallel hardware domain. One then still has to take care that interconnections are not too long though by e.g. limiting the intra cluster size. This creates a first new subbranch. An alternative new subbranch is obtained if one opts for a more dynamic architectural solution. These two new subbranches are further discussed below. Note however that all this is generalizable also for a multi-core SoC which requires a high amount of cluster connections with a large data bandwidth.

The first subbranch comprises solutions with static full connectivity. Multi-stage networks have some form of crossbar implementation. These still require a huge area and energy overhead for large N involving $N^2$ transfers. A partial solution exists in power-gating all connections not required during the actual running of an application instance, in this way restricting the overall energy. Then still the same area is required and consequently, still a strong energy overhead remains in scaled technology nodes due to the needlessly long lines in the oversized layout. The TrueNorth project uses this approach. However, this solution is still not attractive due to the lack of full scalability and of sufficient parallelism. It requires a huge energy budget, so it is not suited for embedded portable usage, only for "shared servers in the cloud". Also then it is only for server farms with a large power plant, which does not include distributed warehouse servers, which have to be plugged into the local power supply.

Solutions in the second subbranch have dynamic full connectivity. They exploit the fact that longer inter-cluster connections are needed more rarely. It is not known upfront where these connections are situated though, so a run-time layer is needed to accommodate the actual transfers at instantiation time. One way to achieve dynamic full connectivity is exploiting hardware based control protocols using some type of statically allocated Network-on-Chip (NoC) or multi-stage network approach. This approach is adopted e.g. in the paper "A Memory-Efficient Routing Method for Large-Scale Spiking Neural Networks" (S. Moradi et al., Eur. Conf. on Circuit Theory and Design (ECCTD) 2013, September 2013, pp. 1-4). A Local Parallel Global Sequential (LPGS) is used there to obtain a parallel implementation of a quite strongly connected "static" intra-cluster organization and a largely sequential (time-multiplexed) implementation of more sparsely connected time-varying inter-cluster communication.

Application US2015/058268 (IBM) presents a hierarchical, scalable neuromorphic synaptronic system for synaptic and structural plasticity. However, the obtained scalability is limited: local connections are performed with "sparse crossbar tables", which however that does not allow realizing global connections in a fully flexible way. The system is still dimensioned at design time. The proposed solution does not achieve scalability and low power simultaneously.

Hence, there is a need for alleviating the intermediate length interconnection problems encountered in global data communication networks connecting a plurality of computation clusters.

SUMMARY

Embodiments described herein provide for a method for designing a data communication network wherein intermediate length interconnection problems are solved so that full dynamic connectivity and scalability is achieved. It is also an object to provide a data communication network with such features. It is a further object to provide a method for operating such a data communication network.

The above objectives are accomplished according to present embodiments.

In a first aspect, some embodiments relate to a data communication network connecting a plurality of computation clusters. The data communication network is arranged for receiving via N data input ports, N>1, input signals from one or more first clusters of the plurality and for outputting output signals to one or more second clusters of that plurality via M data output ports, M>1. The communication network further comprises a segmented bus network for interconnecting clusters of the plurality and a control means arranged for concurrently activating up to P parallel data busses of the segmented bus network, thereby forming bidirectional parallel interconnections between P of the N inputs, P<N, and P of the M outputs, P<M, via paths of connected and activated segments of the segmented bus network, wherein the segments are linked by means of segmentation switches, wherein the N data input ports and the M data output ports are connected via stubs to a subset of the segmentation switches on the P parallel data busses, and wherein the segmentation switches being implemented at least partly in a back-end-of-line (BEOL) fabric of at least one electronic integrated circuit wherein the clusters have been fabricated.

The proposed embodiments indeed allow meeting the above-mentioned objectives. By providing a segmented bus network for interconnecting clusters and using up to P parallel data busses of that network for allocating data connections, bidirectional parallel interconnections are established between P of the inputs and P outputs in a fully dynamical fashion. In that way, there may be less bandwidth allocation at design time and the energy overhead can drastically be lowered. The proposed embodiments allow for scaling by adapting the integer number P. Further, by implementing the data communication network at least for a part in a BEOL fabric of at least one electronic integrated circuit wherein the clusters have been fabricated, the scalability and in particular the energy-efficiency of the proposed embodiments is even more improved. The realization of some of the segmentation switches in BEOL allows directly reducing the vertical wire length in a substantial way (because one does not have to go back and forth to the FEOL layer for all devices in the segmented bus) and also the horizontal wire length is reduced because a significant amount of devices can be removed from the FEOL layer, so the overall area then reduces with a resulting average wire reduction. So, as a result, the specific trade-offs between the main design objectives are changing, in particular area, energy and performance. This BEOL device implementation can be applied in this context because the global inter-cluster connections can be expected to be stable for long periods of time, so they do not have to switch at the most advanced clock rates, which otherwise would only have been feasible with the strongly speed-optimized FEOL devices.

In an embodiment the segmentation switches are 3-way switches based on TFT devices. The segmentation switches can be implemented with Gallium-Indium-Zinc-Oxide, GIZO, devices, which exhibit very low leakage, further reducing the global power and energy cost functions.

In another aspect, some embodiments relate to a method for designing a data communication network connecting a plurality of computation clusters, wherein the data communication network is arranged for receiving via N data input ports, N>1, input signals from one or more first clusters of the plurality and for outputting output signals to one or more second clusters of the plurality via M data output ports, M>1. The method comprises: providing a segmented bus network for interconnecting clusters of the plurality of computation clusters and a control means for concurrently activating up to P parallel data busses of the segmented bus network; providing segmentation switches to link segments of the segmented bus network and so create paths of connected and activated segments of the segmented bus network to form bidirectional parallel interconnections between P of the N inputs, P<N, and P of the M outputs, P<M, whereby the N data input ports and the M data output ports are connected via stubs to a subset of the segmentation switches on the P parallel data busses; and implementing the segmentation switches at least partly in a back-end-of-line (BEOL) fabric of at least one electronic integrated circuit wherein the clusters have been fabricated.

In an embodiment the method comprises determining the P from a profiled histogram of concurrently occurring inter-cluster connection patterns in at least one given application.

In an embodiment the method comprises determining the P as the maximum number of concurrently required data interconnections of the connection patterns in the profiled histogram.

In another embodiment a position matrix of the segmentation switches on the P busses is determined based on the top X % of the most likely concurrently occurring connection patterns in the profiled histogram, where X is a user-defined threshold.

In one embodiment the P parallel busses are selected among S busses of the segmented bus network by performing a pruning based on application profiling.

A backup of additional segmentation switches is provided, based on a maximal concurrent set of connection patterns starting from each of the N data input ports or ending in each of the M data output ports.

In an embodiment the floorplanning of the plurality of computation clusters is based on the frequency of occurrence of individual connections, wherein the frequency of occurrence is derived from profiling information.

In another embodiment computational clusters are ordered on an individual bus of the P busses based on frequency of occurrence of individual connections, wherein the frequency of occurrence is derived from the profiling information.

In one embodiment the data communication network is implemented in a 3D layer structure. Doing so improves the scalability.

In yet another aspect, some embodiments relate to a method for operating a data communication network comprising a plurality of computation clusters and arranged for receiving via N data input ports, N>1, input signals from one or more first clusters of the plurality and for outputting output signals to one or more second clusters of the plurality via M data output ports, M>1. The method comprises: providing a segmented bus network for interconnecting clusters of the plurality; activating concurrently P parallel busses of the segmented bus network, thereby forming bidirectional parallel interconnection paths between P of the N inputs, P<N, and P of the M outputs, P<M, via segments of the segmented bus network, wherein the segments are linked by means of segmentation switches, implemented at least partly in a back-end-of-line (BEOL) fabric of at least one electronic integrated circuit wherein the clusters have been fabricated.

In an example embodiment the method comprises a step of performing time division multiplexing of the concurrently required data interconnections of the profiled histogram, whereby the time multiplexing factor does not exceed the ratio of the realizable clock frequency of the implementation fabric and a required data rate between data inputs and outputs of the clusters.

The time-division multiplexing can be organized according to a Local Parallel Global Sequential scheme.

For purposes of summarizing various embodiments, certain objects have been described herein above. Of course, it is to be understood that not necessarily all such objects may be achieved in accordance with any particular embodiment. Thus, for example, those skilled in the art will recognize that some embodiments may be embodied or carried out in a manner that achieves one object as taught or suggested herein without necessarily achieving other objects as may be taught or suggested herein.

The above and other aspects will be apparent from and elucidated with reference to the embodiment(s) described hereinafter.

BRIEF DESCRIPTION OF THE FIGURES

Certain embodiments will now be described further, by way of example, with reference to the accompanying drawings, wherein like reference numerals refer to like elements in the various figures.

DETAILED DESCRIPTION

Figure 1:
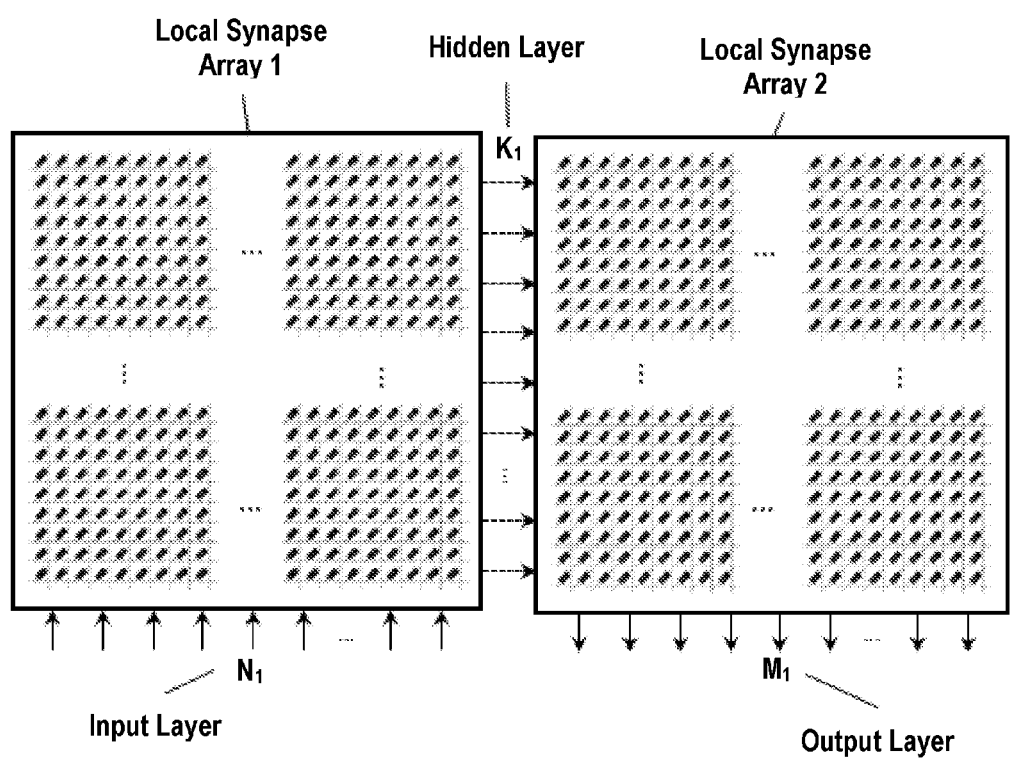
FIG. 1 illustrates a conventional neural network stage with three neuron arrays (input, output and hidden layers) and two dense local synapse arrays, according to example embodiments.
Figure 2:
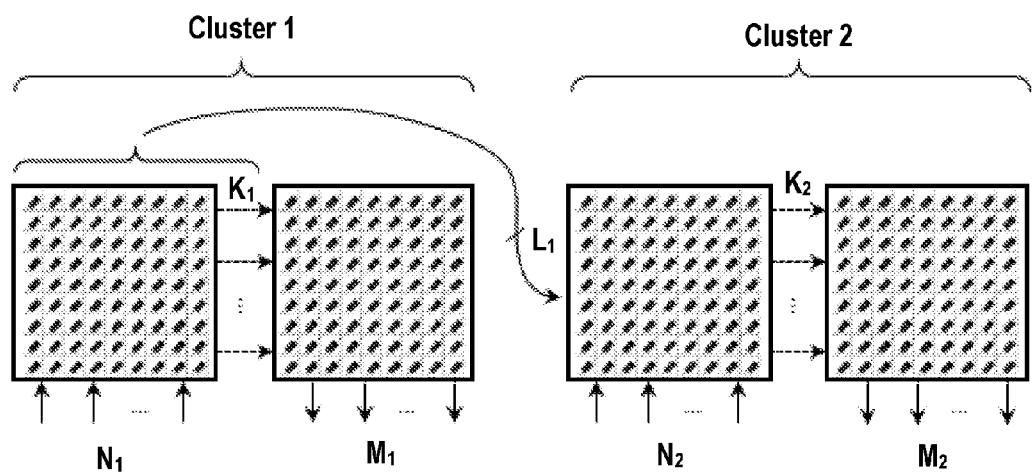
FIG. 2 illustrates two neural clusters that are connected with a subset of all possible connections between the neuron layers of the clusters, according to example embodiments.

Certain embodiments will be described with respect to and with reference to certain drawings, but the drawings and description should not be viewed as limiting.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that the only relevant components of the device are A and B.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of example embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention to require more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

It should be noted that the use of particular terminology when describing certain features or aspects should not be taken to imply that the terminology is being re-defined herein to be restricted to include any specific characteristics of the features or aspects with which that terminology is associated.

In the description provided herein, numerous specific details are set forth. However, it is understood that embodiments may be practiced without these specific details. In other instances, well-known methods, structures and techniques have not been shown in detail in order not to obscure an understanding of this description.

Some embodiments are concerned with making the global data communication in a large scale communication network scalable to a huge amount of clusters with dense interconnect networks. To obtain true scalability they are complemented with low-power communication, as detailed below. With global communication is meant the communication between the various clusters of the network. Local communication refers to the communication within the dense interconnect networks. The focus is on intermediate length interconnection problems, which refers to the conventional terminology in the process technology community where a distinction is made between local interconnect (realized very close to the FEOL and limited typically to tens or at most hundreds of nm), the intermediate interconnect realized in the BEOL spanning tens of nm up to hundreds of $\mu$m) and the global interconnect (which spans mm or cm length and which is either realized in the top-layers of the BEOL or above the BEOL in the interposer layers or 3D package itself).

Figure 3:
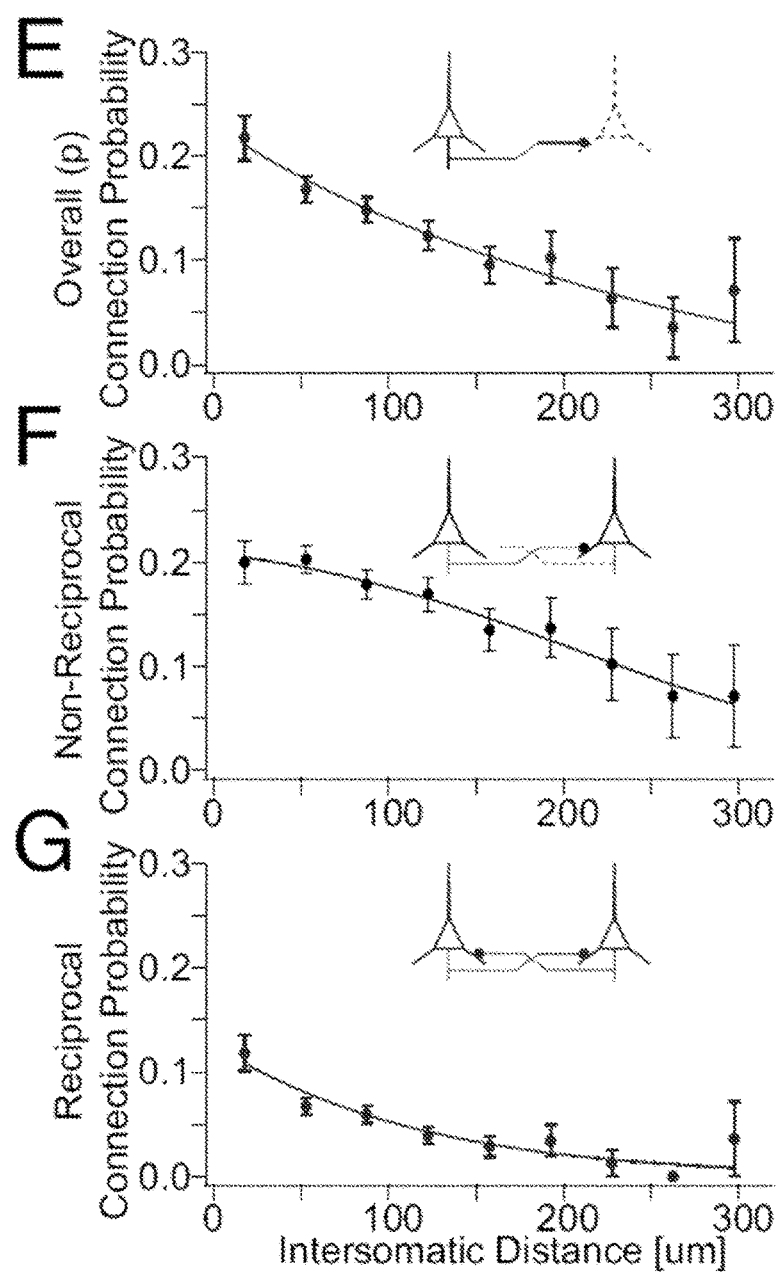
FIG. 3 illustrates the probability as function of the distance ranges in synaptic connections, according to example embodiments.

The envisaged communication platforms have some technical features in common. They have a sufficient amount of global connections. So, a mostly local interconnection network inside a cluster without a significant amount of inter-cluster connections does not suffice. Moreover, they only need few of such more global connections simultaneously at highest level, but not statically the same over time. Still, covering all families of applications/algorithms necessitates potentially connecting "any" intra-cluster component (e.g. neuron) to "any" other cluster at some moment. In general connection lengths between clusters are distributed with decreasing upper bound as a function of inter-cluster distance (see e.g. FIG. 3 which shows the connection probability of the neurons depending on the distance between the neural clusters in an actual human brain). In the present case one aims at artificial neural networks so that information cannot be measured directly. In the general case of inter-cluster SoC communication there are no neurons to measure even. Hence, instead the histogram information can be obtained based on profiling of typically occurring inter-cluster connections, either seen as individual connections (ignoring the cross-correlation) or as correlated connection patterns. These histograms are obtained from executing a representative set of target applications with their corresponding long test stimuli on the inter-cluster data communication network and the processing clusters that are communicating. The profiling can occur fully at design time already, but it can also be adapted with new information derived at run time. For instance, assume that at design time a broad targeted set of applications has a particular histogram shape (which can in principle be any "decreasing" curve, and it could be e.g. as shown in FIG. 3 for a neural network), but at run time only one particular application (e.g. image recognition) is running for a very long time, then the specific shape of the histogram will differ during that period, which can be exploited in dimensioning the actively powered-up communication architecture organization and in this way further reducing the dynamic and leakage energy. For the inter-cluster communication networks several types of histograms are used, with different information on the x and y axis, as described further in this description.

A chip implementation is aimed at with low overall power/energy consumption. In modern technology power/energy consumption is dominated by the interconnect capacitance. A mostly spatially realized architecture is therefore not efficient because of the resulting total interconnect length. Instead the time multiplexing potential may be exploited by increasing the clock rate to arrive at high frequency operators and storage access. This minimizes the energy for a given application task as long as the frequency is not increased too far (not beyond 1 GHz). The underlying basis for this is the excessive energy overhead for charge-based connections, especially when they are longer (intermediate or global chip interconnect). Also alternatives like optical communication are too energy-costly for intermediate-level on-chip interconnects due to the overhead of convertors back to the charge domain for the logic components. That makes optical communication only really suited for inter-chip communication. Spin-based communication may be better, but no good existing solution is available (yet) for heavily connected topologies. Even emerging 2D materials like graphene with ballistic or wave transport do not offer a well-matching solution. So it is assumed strong time-multiplexing with a ratio between clock and sensor data input rate of $10^5$ or even higher can be exploited. In cases where no fully synchronous solution is used, it is most likely based still on a synchronous island in an asynchronous sea concept. There, the intra-cluster components (e.g. neurons) are updated still at a high frequency with a large degree of time multiplexing, but the communication between them is asynchronous.

As many systems can have many components (e.g. neurons) active in parallel, a strongly parallel architecture may be used with a large interconnection bottleneck if a rather broad target application domain is envisioned. This broad target market may amortize the non-recurring engineering (NRE) cost of scaled technologies. So, more custom ICs in advanced technology nodes are not economically viable. Due to this expected NRE cost, also programmable heavily reusable platforms may be used.

Some embodiments present a middleware based run-time approach where the required data connections are fully dynamically allocated to reduce the number of parallel global bus connections. Due to the middleware control true dynamic full connectivity is achieved, so solving the global inter-cluster communication bottleneck with low energy, while still covering a wide application range. By fully exploiting the upper bound distance graph combined with the exploitation of profiling information of the histogram, less parallel bandwidth allocation may be used at design time. The energy overhead is so heavily reduced. The use of a segmented bus network 10 (see FIG. 4) optimized for the required distance graph is proposed. It connects via switches 11 the available clusters 20 to each other and also ensures the communication with the source clusters (or sensors 40) and the final destination clusters (or actuators 50). This can be achieved by allocating only P parallel buses (P=2 in FIG. 4, namely the two horizontal busses), where P is the maximal amount of simultaneously alive global transfers. That information can be obtained from one of the profiled histograms. The histograms have the number of simultaneous active connections on the x axis, and an indication of how often this occurs (e.g. as a percentage between 0 and 100%) in a representative application benchmark set on the y axis. Such a histogram is typically obtained by adding profiling instructions to dump the above-specified data from the neural application benchmark codes executing on a simulator or on a prototype hardware platform. The code does not need to be platform-optimized for this, only the application functionality should be the final one. If a threshold is then imposed on the minimum percentage of occurrence (y axis in the histogram), one can typically discard the right hand side of the histogram with the larger amounts of simultaneous active connections. Hence, the maximal simultaneous connection count can then be further limited. At run time, it could still exceptionally occur that the limit imposed at design time is exceeded, but the rare connections that cannot be accommodated, then have to be delayed to a next communication cycle. This is especially easy to achieve in an asynchronous inter-cluster communication protocol. This restriction of the maximal P should be combined with activity-based floorplanning to further reduce the energy. In that case a block ordering is performed based on the profiling information. By utilizing the segmented bus network topology, also existing physical bus libraries like AMBA-lite can be reused wherever possible (if the control protocol allows this).

This approach substantially deviates from alternate approaches and enables truly scalable ultra-low energy global connections without having to sacrifice the practically required (dynamic) global communication bandwidth for spanning a broad set of application/algorithm families. This is in the first place due to the proposed selection of the best multi-stage segmented bus topology and application mapping (middleware control) for a large amount of clusters. Hence, the dynamic run time flexibility of biochemical connections in the brain is mimicked by similar flexibility and energy efficiency in a middleware-controlled time-shared segmented bus network. Also for the inter-core System on Chip communication context similar research issues are present still.

Figure 5:
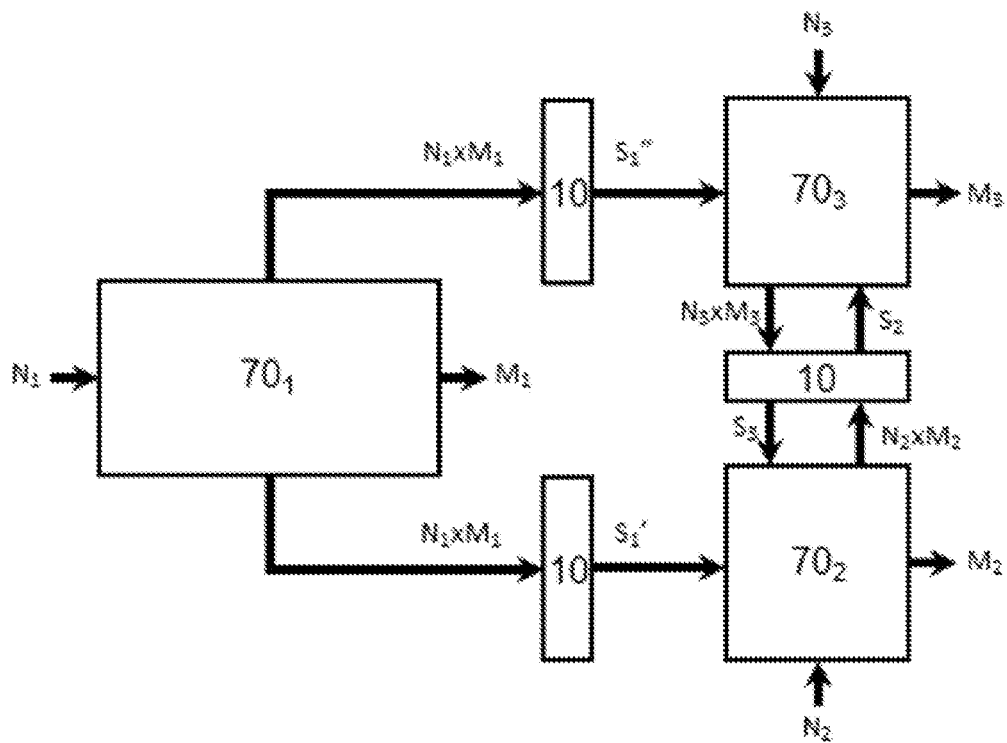
FIG. 5 illustrates a system with three neural clusters that are connected with segmented bus networks, according to example embodiments.
Figure 6:
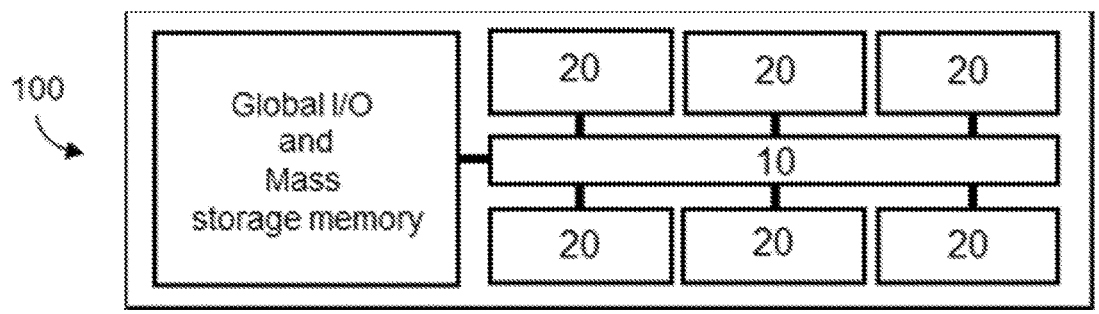
FIG. 6 represents the inter-tile communication network for an SoC, according to example embodiments.
Figure 7:
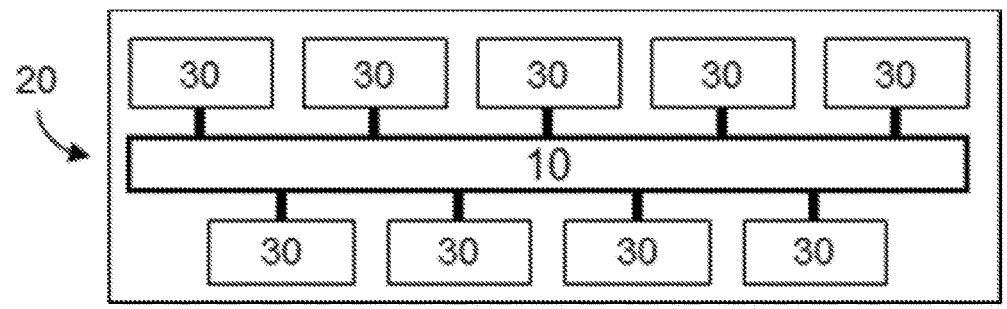
FIG. 7 represents the intra-tile communication network for the SoC of FIG. 6, according to example embodiments.

FIG. 5 illustrates a system with three neural clusters 70 being connected to each other via a segmented bus network 10. The three densely connected neural clusters 70 each have input ($N_i$ for i=1 to 3) and output ($M_i$) neuron layers, with internally potentially hidden layers. For a full connection one may use $S_1 = N_1 \times M_1$ connection switches/synapses for the communication network between cluster 1 and 2, but that is obviously unaffordable. In the static state-of-the-art, a much smaller number of possible connections would be determined upfront and it cannot be changed anymore at run time. In the dynamic segmented bus approach described here, it is allowed to have a much smaller $S_1 \ll N_1 \times M_1$ but one can still determine at run time any subset of maximally $S_1$ simultaneous active connections out of the $N_1 \times M_1$ possible ones to be activated. The $P_1$ coming out of the profiled histogram pruning stage is typically sufficient, but it is not always possible to provide enough benchmarks in the profiling stage to be sure this will suffice for all the future application codes. So, as described a bit further, to mitigate for this a margin can be selected and based on this $P_1$ can also be extended to a large value $S_1$. That value $S_1$ is then used for the final hardware dimensioning. In a similar way the other inter-cluster communication networks are implemented, namely between cluster 1 and 3, and mutually among cluster 2 and 3 in this example. For each of these, the actual $S_i$ is much smaller than the maximal amount $N_i \times M_i$. The connection between clusters sharing a cluster as the common source (like cluster 1 is sharing connections to both cluster 2 and 3 in the example) does not need to be identical, leading to the choices of $S_i'$ and $S_i''$ in the example. FIG. 6 gives an example of an inter-tile segmented bus network 10 connecting a number of clusters 20. The tiles share the global I/O and the large-size mass memory storage. Each of the tiles in FIG. 6 typically also has an intra-tile network organization as illustrated in FIG. 7. The processing elements 30 are interconnected via the communication network 10. That network 10 has a similar structure as the ones used in FIG. 6, but the specific parameter instantiation is of course application specific.

In a floorplanning for a shared bus all the blocks (i.e. the physical layout of the clusters) are connected via a single network, so no variations are present for the netlist layout of the network. In a segmented bus on the contrary, the network is divided into segments by the switches 11 (see FIG. 8). The activity of the segment is determined by the application, but also by the layout choices and the way the applications are mapped to the topology. So it is proposed to use activity-aware block ordering and floorplanning for optimizing energy. The basic principles are known in the art, but they are reprojected for large global inter-cluster networks (e.g. global synapse networks). The use of the profiled histogram information in the proposed approach is an example of such a non-trivial innovation in the reprojection.

Figure 8:
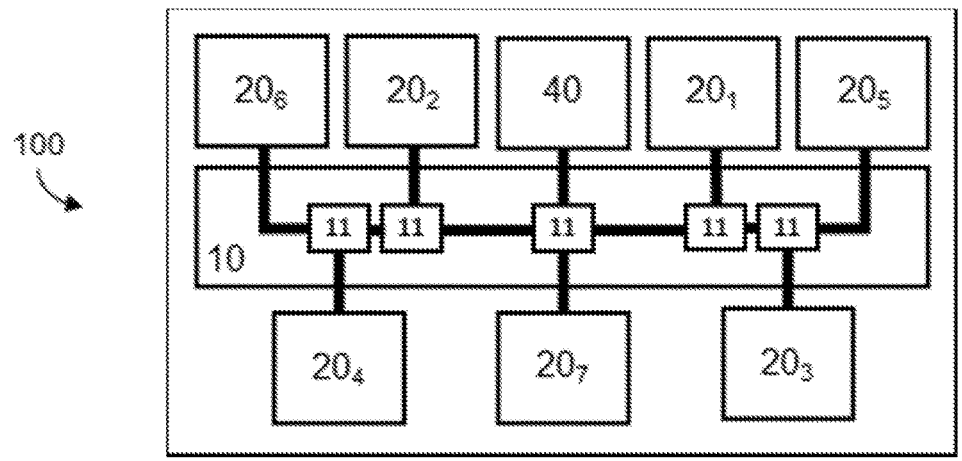
FIG. 8 illustrates the segmented bus network instance which is used as example for the activity-aware floorplanning with "onion layers" for the stacked segmented bus network in FIG. 9, according to example embodiments.
Figure 9:
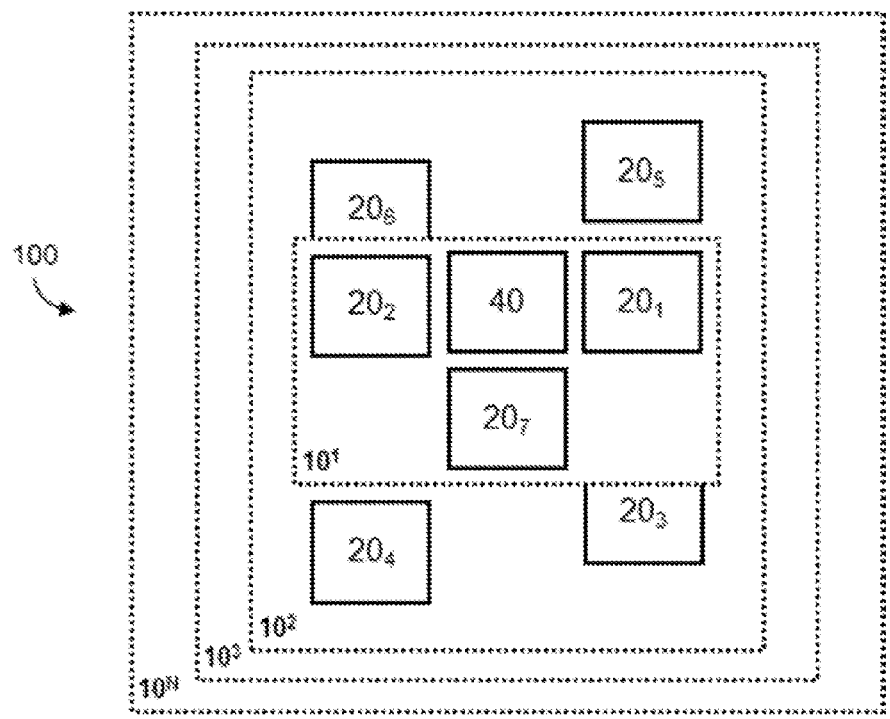
FIG. 9 illustrates activity-aware floorplanning with "onion layers" for a 3D stacked segmented bus network, according to example embodiments.

It is especially important to organize the floorplan in the 2D and 3D projections in a good way to allow the most active clusters to be positioned in the center of the 2D and in the 3D, respectively, segmented bus network and then expanding gradually in onion-type layers around this center with lower and lower connection probability. This is illustrated in FIG. 8 for the 2D case and in FIG. 9 for the 3D case. In particular, the profiled histogram of these global inter-cluster connections and the distance matrix determine which clusters have the highest activities in their communication and these should be located in the "center" of the segmented bus topology so that their average connection length (and the capacitive loading on the active segments) is lowest. Going farther away from this center, the clusters with a lower dynamic connection count are placed. This same principle is also used for the organization of the 3D floorplanning of the data communication network (see further). In that case the activity based floorplanning leads to an "onion-layered volumetric floorplan" with the highest activities in the center of the onion (see FIG. 9).

The segmented bus organization makes it more expensive for the clusters connected away from the center to have to communicate with the other clusters because more segments and stubs (i.e. cross-connections between the P segmented busses) are then blocked. Moreover, larger capacitances have to be powered up and down. The profiling of the histogram and the technology choices (e.g. BEOL vs FEOL) also determine the number and the position of the stubs in the segmented bus communication network. The specific trade-offs in the design process derived from the profiling change the main design objectives, in particular area, energy and performance, e.g. due to the change in the wire length.

Less bandwidth allocation may be used by exploiting the upper bound of the histogram of connection lengths in terms of inter-cluster distance (see above). However, in this way it remains difficult or even impossible to exploit the detailed profiling info of the histogram though. Hence, a worst case upper bound distance based network would have to be allocated then. So, still a high energy overhead is expected in practical realizations due to long sequential "data pass" sequences across the Network-on-Chip (NoC) links. That is also true for NoCs that exploit energy-optimized spatial time multiplexing as in "Concepts and implementation of spatial division multiplexing for guaranteed throughput in networks-on-chip" (Leroy et al., IEEE Trans. on Computers, Vol. 57, No. 9, pp. 1182-1195, September 2008) or in the NoCs which are used in the neuromorphic computing network proposal of Moradi et al. (see "A Memory-Efficient Routing Method for Large-Scale Spiking Neural Networks", Proc. 21st Europ. Conf. on Circ. Theory and Design, ECCTD, Dresden, September 2013).

So instead it is proposed to further reduce the power and energy overhead in the following way. The maximum amount of simultaneously active connections can be obtained from the maximum in the profiled histogram. Typically, this upper-bounding happens on the individual inter-cluster connections. However, it may be desirable to take into account the cross-correlation of the connection patterns, so that version of the profiled histogram will be used. That upper bound/maximum determines the parameter P in the proposed data communication network. However, given that this is still profiling-based and not fully certain, in order to provide some slack it can also be decided to over-dimension this a bit with a designer-based margin, so several additional busses can be added in the segmented bus network to arrive at a total of S. In that case normally only P of them are needed. So it also has to be decided then which P out of S are the default activated at run time.

Figure 4:
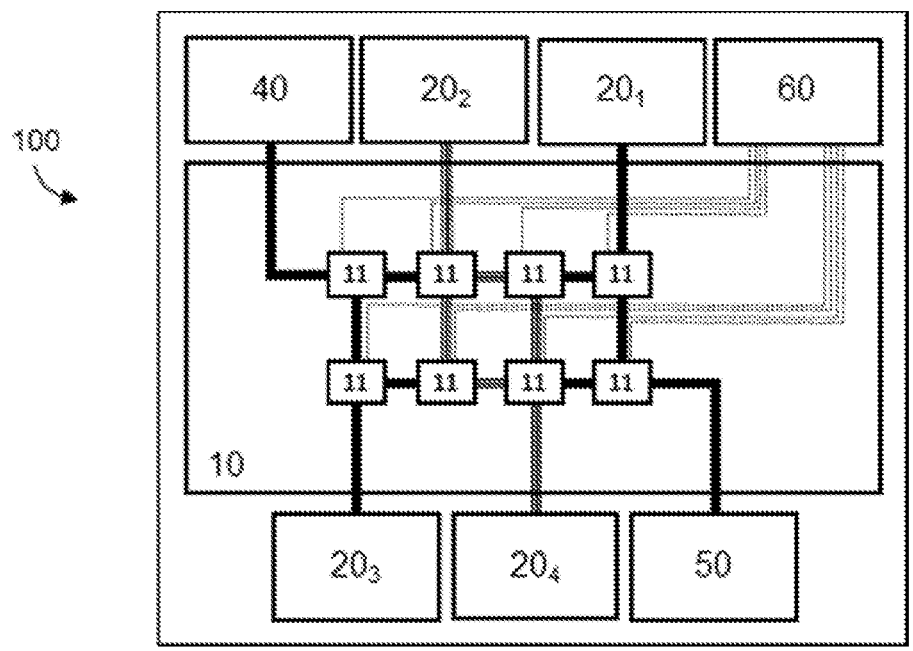
FIG. 4 represents a block scheme of an embodiment of a dynamically controlled segmented bus network (with S=2), according to example embodiments.
Figure 10:
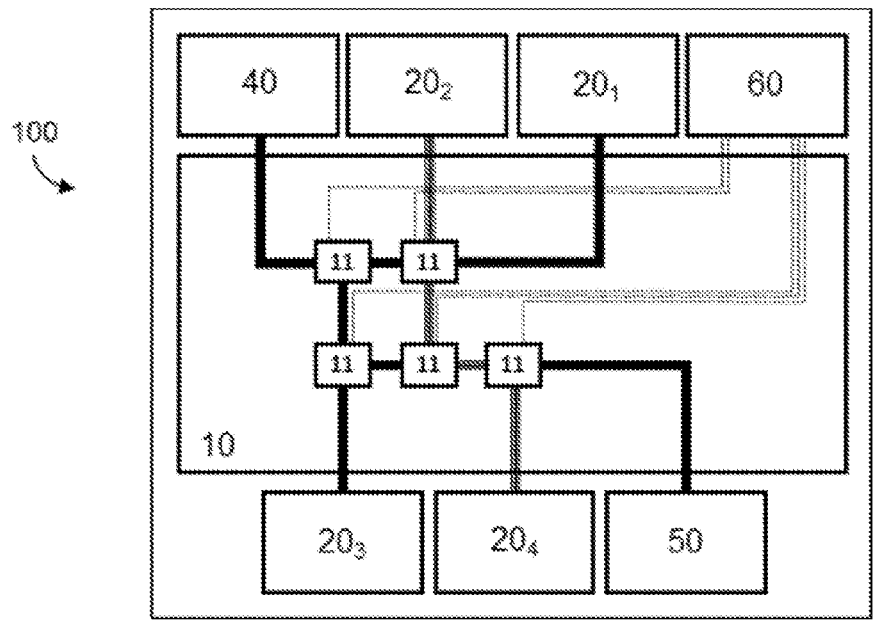
FIG. 10 illustrates a block scheme of a pruned embodiment of the dynamically controlled segmented bus network of FIG. 4, according to example embodiments.
Figure 11:
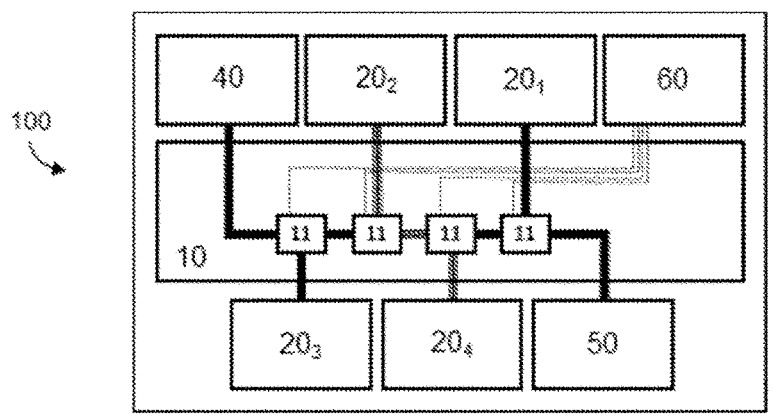
FIG. 11 illustrates a block scheme of another pruned embodiment of a dynamically controlled segmented bus network starting from FIG. 4 (with S=1), according to example embodiments.

Without loss of generality assume that N>M. Another area saving can be obtained by not placing P×N switches, so by not using a "full" switch matrix topology on the segmented bus. That can best be decided based on the simultaneously required inter-cluster connections which may be used to execute the typical applications. This can be derived from the histogram of correlated connection patterns. When only the top x % (designer-defined) most occurring connection patterns are taken, not all of the P×N potential switch positions will have to be present. This is illustrated with an example. The default switch topology of FIG. 4 is compared with the pruned topology of FIG. 10. Here 3 of the 8 initial switches 11 have been removed on the right hand side. That has been decided based on the histogram of correlated connection patterns. In this case it means that the direct connection from cluster 2 to the actuators 50 or to cluster 4 is not so active. Moreover, it also implies that the simultaneous connection from cluster 1 to the actuators is not sufficiently often required together with the cluster 3 to 4 connection. When these more rarely occurring connection patterns would be present at run-time, it means that they have to wait for the next available time slot and hence a latency is induced on these. The application running on the platform has to be able to tolerate this then. If that is not the case for a subset of the connection patterns, then these latency-critical patterns have to be included by constraint on top of the x % of patterns to be kept. It can also be that based on the histogram information the original topology is even more pruned, by reducing P (as illustrated in the example of FIG. 11 where P is 1 instead of 2 in the initial FIG. 4).

The most important saving is however possible on the energy consumption by activating less than P busses and much less segments and switches than the maximal amount P×N. This is again based on the top ranking (in this case e.g. y %) of most occurring connection patterns. In particular, only (power-up) a limited set of switches is activated and the other are left in full power-down mode which means that they cannot be quickly (i.e. in a few clock cycles) be activated any more. This is especially important for the devices which are still required to be implemented in the FEOL layer, where leakage is expected to increase significantly for further scaled nodes. In addition, this also allows reducing dynamic energy significantly because of the earlier-discussed activity-based floorplanning. In the 3D case, it means the y % most active patterns are fully mapped onto the inner onion layers (e.g. layer $10^1$). In this case, when the deactivated switches are required at run time, some latency is induced again due to the need to power-up the additional switch resources. In practical implementations this power-up/down process is not implemented based on individual switch granularity but at a somewhat coarser granularity, so with so-called power islands.

Figure 12:
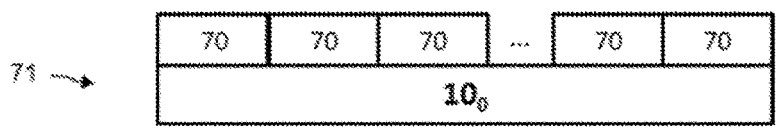
FIG. 12 illustrates the first (lowest) layer of a representative hierarchically stacked segmented bus network, according to example embodiments.

All this can be made scalable with BEOL device technology and by exploiting a 3D implementation technology in the following way. This is illustrated for the neuromorphic computing case, with the option that the BEOL devices are based on thin-film transistors (TFTs) and that the local synapse matrices are based on a resistive RAM (RRAM) memory technology. The latter is a popular approach in recent neuromorphic computing literature. The goal now is to connect order of magnitude $10^{10}$ neurons with $10^{15}$ synapses. It is clear already that this would not be achievable with static crossbar networks because then $10^{10} \times 10^{10} = 10^{20}$ synapse positions would be needed. So with the segmented busses a maximum number of $10^{15}$ connections are implemented of which much fewer are typically simultaneously active. The only problem is that it is not known in advance which of these connections and switches are going to be required. So for energy efficiency care will be taken that only a small x % of segmentation switches is really implemented and an even tinier y % of active switches (in the heart of the onion layers) will be powered up. It is assumed a time-multiplexing degree of about $10^5$ is possible where a 0.1 ms neuron activation period is compared with a 1 ns clock cycle. So $10^4$ time-multiplexed physical neurons then need to be realized with $10^9$ time-multiplexed synapses. Assume these neurons are organized in 1000 groups of 10 clusters, each with 1000 in/out signals, and assume 100 of these are to be active simultaneously. This means P=100 in the segmented busses 10 at layer 0. Each of these can be connected with max 10*1000=10K signals, but in practice one can prune due to the correlated connection pattern information in the profile histogram. Assume 1000 with 100 potential switches, 2000 with 30 switches, 3000 with 20 switches and 4000 with 10 switches. This leads to 260K switches required for one group at layer 0. This is quite feasible in the TFT BEOL technology under top-level 1 RRAM partition of 16 Gbit. This layer 0 segmented bus network $10_0$ is shown in FIG. 12, wherein the blocks 70 denote memory (RRAM) arrays.

Figure 13:
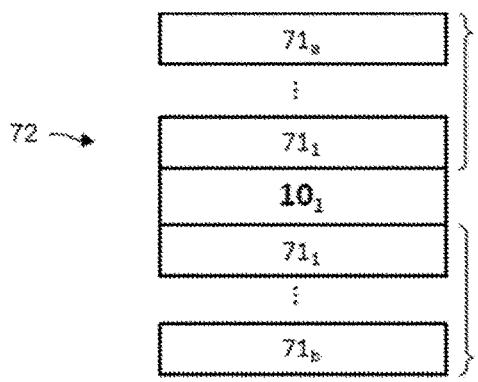
FIG. 13 illustrates the second (middle) layer of a representative hierarchically stacked segmented bus network, according to example embodiments.

Then 32 supergroups are considered which each have to combine 100 in/out signals of layer 0 segmented bus for 34 groups. Assume 100 of these are to be active simultaneously again, meaning P=100 in the segmented busses $10_1$ at layer 1. Each of these can be connected with maximum 34*100=3.4K signals but in practice one can prune due to the distance matrix and profile histogram. Assume 100 with 100 switches, 500 with 30 switches, 1000 with 20 switches and 1800 with 10 switches. This leads to 73K switches required for 1 supergroup at layer 1. This is quite feasible in the TFT BEOL technology under top-level 1 RRAM partition of 16 Gbit. This segmented bus layer 1 network is shown in FIG. 13. The blocks $71_i$ denote a plurality of segmented bus networks as shown in FIG. 12.

Figure 14:
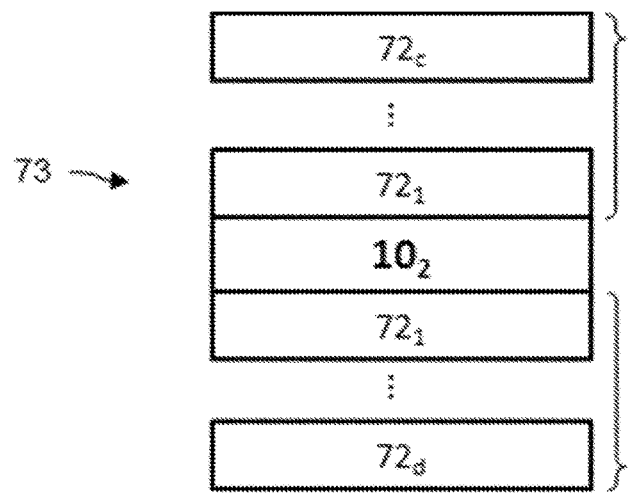
FIG. 14 illustrates the highest layer of a representative hierarchically stacked segmented bus network, according to example embodiments.

Finally, the 100 in/out signals of the 32 supergroups (72) have to be combined in a segmented bus layer 2 at a top group. Assume 100 of these are to be active simultaneously again, which means P=100 in segmented bus at layer 2. This can be connected with max 32*100=3.2K signals but in practice one can prune due to the distance matrix and profile histogram. Now more switches per supergroup are used to allow more global/longer connections, but also this is quite feasible in the TFT BEOL technology under top-level 1 RRAM partition of 16 Gbit. As more global connections are used probably in this top group, more care can be employed with the onion type activity-aware floorplanning. This layer 2 segmented bus network $10_2$ is shown in FIG. 14. The blocks $72_i$ denote a plurality of segmented bus networks as shown in FIG. 13.

Now the entire switch topology is defined and the run time control aspects of the proposed approach can be addressed. As shown in the paper "Control for Power Gating of Wires" (K. Heyrman et al, IEEE Trans. on VLSI Systems, Vol. 18, No. 9, pp. 1287-1300, September 2010), the control plane of such a segmented bus has to be designed with care. The best-practice principles discussed there may be reused herein. They have to be projected towards this specific context but this is considered to be (much) less innovative so it is not further detailed here.

Moreover, the proposed embodiments to keep the power and energy at an ultra-low level can be based on a system scenario-based segment switch control approach. This system scenario based approach is described e.g. in "System Scenario based Design of Dynamic Embedded Systems" (V. Gheorghita et al., ACM Trans. On Design Automation for Embedded Systems (TODAES), Vol. 14, No. 1, article 3, January 2009) paper combined with patent application EP2685395. The system scenario detection and scenario execution phases are then realized in the middleware executing on a control processor block 60 in FIG. 4. The latter steers the segmented bus switches for implementing the desired application instance which is executed on the neuromorphic or multi-core SoC platform. In particular, the above mentioned connection pattern profiling information again is used as input for the scenario identification step which is also requiring such profiling information. Once the most suitable system scenarios are selected, it is determined which control signals may be used to steer the segmented bus network for this reasonably limited set of system scenarios. At run-time the system scenario detection techniques are used to detect which system scenario is actually present. This then allows activating the proper set of stored switch control signals from the predefined set, e.g. stored in a look-up-table. Obviously a trade-off is present between the number of system scenarios and the energy-efficiency of the segmented bus network. If more different connection patterns are clustered into a single system scenario, the superset grows and then more switch overhead is induced because more simultaneously active switches have to be present. Hence, it is expected that for the neuromorphic computing case a substantial amount of system scenarios still needs to be present (possibly thousands or even tens of thousands for full scale neuromorphic networks).

In one embodiment the distributed loop buffer concept as described in EP1958059 B1, which was initially intended for conventional instruction-set processor programming, can be reused. This is very energy-efficient to realize the look-up-table storing the (instruction) control bits for the potentially huge amount of 3- and 4-way BEOL switches. For the multi-core SoC context the distributed loop buffer concept is easy to reuse because the number of clusters and the number of switches is typically not too huge then, and the natural form of a large many core platform already contains the hierarchy which is required to efficiently use the distributed loop buffer control. For the neuromorphic synapse control, however, it should be reused in a reprojected form. For instance, in the illustration of FIG. 14 about 270K switches are needed. Each of these would require at least 4 bit control, so over 1 million bits have to be generated for each system scenario. If there are tens of thousands of system scenarios, the partitioning of the distributed loop buffer approach is very critical, but the energy gains compared to a conventional centralized instruction/control table is also huge. Moreover, a distributed loop buffer approach is very well matched to the exploitation of system scenarios, as discussed already in EP1958059 B1. It should however also be combined with the suitable instruction bit compression/encoding schemes that are used in conventional microprocessors.

Figure 15:
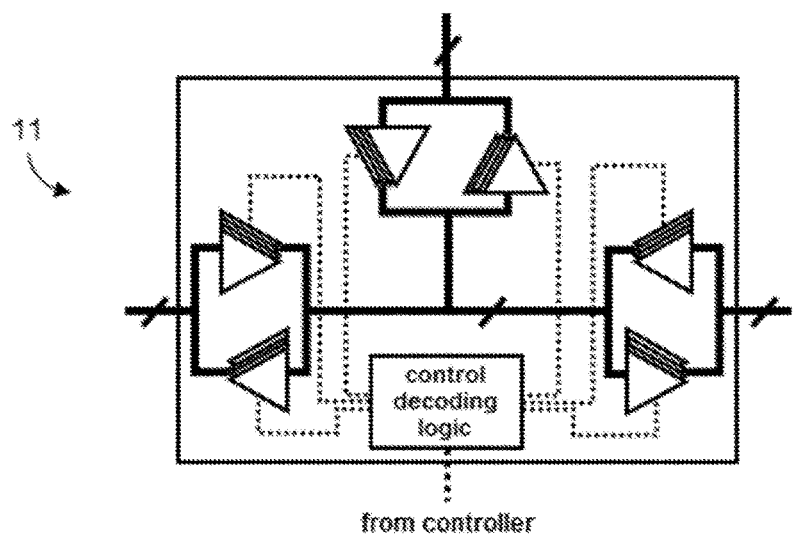
FIG. 15 represents the TFT switch that can be used as switch 11 in the segmented bus network of FIG. 4, according to example embodiments.

The control of the switches does not need to be rerouted often, because it is expected that for long periods of time these global inter-cluster connections are stable. That makes the switches ideally suited for a realization with the BEOL TFT devices. For this the TFT based 3-way switch concept is used as shown in FIG. 15 and described in a patent application with application number EP15167580. The latter are namely ultra-low energy due to their negligible leakage (orders of magnitude lower than CMOS devices) and their low dynamic power (because they are directly fabricated on the middle levels of the BEOL the vertical via routing overhead is fully gone). Their main limitation is the restricted clock frequency they can reach (10-100 lower than CMOS). However, as very frequent rerouting is not required, that is no restriction for the inter-cluster communication network. The segmentation switches can be implemented with Gallium-Indium-Zinc-Oxide, GIZO, devices. These GIZO devices are in the literature sometimes also called IGZO devices, i.e. Indium-Gallium-Zinc-Oxide devices.

It is important that not only the data busses are isolated by nearly non-leaking TFT switches at their boundaries, but also the control lines. As all data bits share the same control, it means a single control line can be shared also in the netlist. If this control line has an "isolation switch" at the point where the controller sends/drives the information of the next control state, this TFT isolation switch can make sure that the control line keeps its state (nearly without leaking) as long as that position of the 3-way data switch should be maintained. In practice, many data values are transferred across the 3 way switch in that position, before it has to be changed. That avoids the waste of unnecessary dynamic energy to be spent on the control lines. The data values can for instance be transferred at a few 100 MHz in a packet of N values and for that entire packet the 3-way switch remains in the same control state. After this packet has passed, it can be that the 3-way switch is not used for some time and then everything is just maintained where the control state is still not modified. Also when the control state for the next data packet maintains the same path, the control line does not need to be updated. Only when a new data packet has to be transferred through another path, the control of the 3-way switch has to be updated and some dynamic energy has to be spent.

In summary, energy and area optimization is targeted in all phases of the design incorporating the impact of scaled process technology. This significantly improves neuromorphic or inter-core SoC communication energy consumption and area overhead, by extending already known principles to a (much) larger scale. These results should be reusable for different realizations of the global inter-cluster communication organization. The approach can most probably be used also for the training phase of the neural network, when the initial segmented bus template is first somewhat over-dimensioned for the training, and then "restricted" (power-down mode) in the energy-optimized trained application execution phase. The above ultra-low-energy inter-cluster communication network principles are then reusable in a broad range of SoC platform communication problems.

Figure 16:
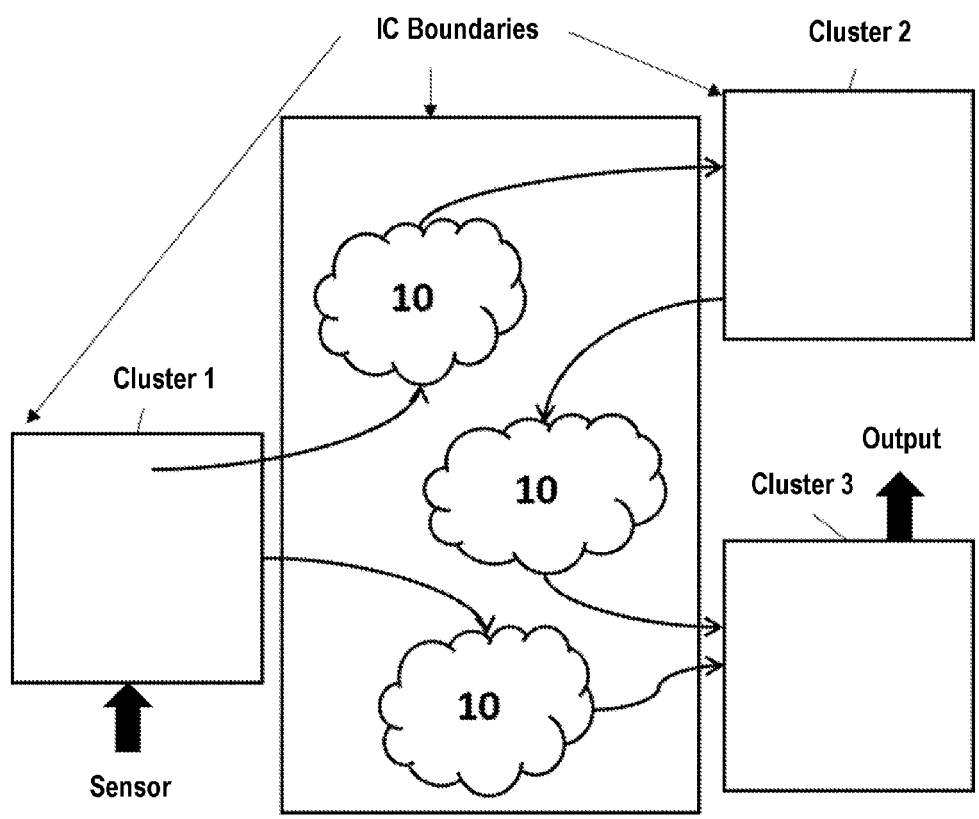
FIG. 16 illustrates an example of a board level implementation, according to example embodiments.

For the neuromorphic context, the above embodiments can be realized in a combined board level implementation with the local synapse embodiments as shown in FIG. 16. For the conceptual realization, the chips are left unpackaged and wire bonding is used for the chip-to-chip connections. The control of the segmented bus switches comes from an off-chip microprocessor to enable flexible testing. For a final product, the global synapse connections are sandwiched between the Front End-of-Line (FEOL) CMOS processing of the neuron and sensor/actuator circuits, and the top-level RRAM crossbar. The BEOL switches of the proposed embodiments are ideally suited to be mixed with the intermediate level metal layers. Only the controller for the switches is realized in the FEOL.

This can be generalized for the inter-cluster SoC communication network where the cores and their local memories are situated in the FEOL, the shared memories can be on top (implemented as a DRAM or one of the emerging non-volatile memories), and the dynamic inter-cluster communication network is again located in the intermediate level metal layers mixed with TFT switches.

While some embodiments have been illustrated and described in detail in the drawings and foregoing description, such illustration and description are to be considered illustrative and not restrictive. The foregoing description details certain embodiments. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A data communication network connecting a plurality of computation clusters and arranged for receiving via N data input ports, N>1, input signals from one or more first clusters of the plurality of computation clusters and for outputting output signals to one or more second clusters of the plurality of computation clusters via M data output ports, M>1 the data communication network comprising:
  a segmented bus network for interconnecting clusters of the plurality of computation clusters;
  a controller arranged for concurrently activating up to P parallel data busses of the segmented bus network, thereby forming bidirectional parallel interconnections between P of the N data input ports, P<N, and P of the M data output ports, P<M, via paths of connected and activated segments of the segmented bus network; and
  segmentation switches linking the connected and activated segments,
  wherein the N data input ports and the M data output ports are connected via stubs to a subset of the segmentation switches on the P parallel data busses, and
  wherein the segmentation switches are implemented, at least partly, in a back-end-of-line (BEOL) fabric of at least one electronic integrated circuit wherein the plurality of computation clusters has been fabricated.

2. The data communication network of claim 1, wherein the segmentation switches are 3-way switches based on thin film technology, TFT, devices.

3. The data communication network of claim 2, wherein the segmentation switches are implemented with Gallium-Indium-Zinc-Oxide, GIZO, devices.

4. A method for designing a data communication network connecting a plurality of computation clusters, wherein the data communication network is arranged for receiving via N data input ports, N>1, input signals from one or more first clusters of the plurality of computation clusters and for outputting output signals to one or more second clusters of the plurality of computation clusters via M data output ports, M>1, the method comprising:
  providing a segmented bus network for interconnecting clusters of the plurality of computation clusters and a controller for concurrently activating up to P parallel data busses of the segmented bus network;
  providing segmentation switches to link segments of the segmented bus network and so create paths of connected and activated segments of the segmented bus network to form bidirectional parallel interconnections between P of the N data input ports, P<N, and P of the M data output ports, P<M, wherein the N data input ports and the M data output ports are connected via stubs to a subset of the segmentation switches on the P parallel data busses; and
  implementing the segmentation switches, at least partly, in a back-end-of-line (BEOL) fabric of at least one electronic integrated circuit wherein the plurality of computation clusters has been fabricated.

5. The method for designing the data communication network of claim 4, further comprising determining the P from a profiled histogram of concurrently occurring inter-cluster connection patterns in at least one given application.

6. The method for designing the data communication network of claim 5, further comprising determining the P as a maximum number of concurrently required data interconnections of the inter-cluster connection patterns in the profiled histogram.

7. The method for designing the data communication network of claim 5,
  wherein a position matrix of the segmentation switches on the P parallel data busses is determined based on a top X % of a set of most likely concurrently occurring connection patterns in the profiled histogram, and
  wherein X is a user-defined threshold.

8. The method for designing the data communication network of claim 4, further comprising selecting the P parallel data busses among S busses of the segmented bus network by performing a pruning based on application profiling.

9. The method for designing the data communication network of claim 4, wherein a backup of additional segmentation switches is provided based on a maximal concurrent set of connection patterns starting from each of the N data input ports or ending in each of the M data output ports.

10. The method for designing the data communication network of claim 4,
  wherein a floorplanning of the plurality of computation clusters is based on a frequency of occurrence of individual connections, and
  wherein the frequency of occurrence of individual connections is derived from profiling information.

11. The method for designing the data communication network of claim 4,
  wherein computational clusters are ordered on an individual bus of the P parallel data busses based on a frequency of occurrence of individual connections, and
  wherein the frequency of occurrence of individual connections is derived from profiling information.

12. The method for designing the data communication network of claim 4, wherein the data communication network is implemented in a 3D layer structure.

13. A method for operating a data communication network comprising a plurality of computation clusters and arranged for receiving via N data input ports, N>1, input signals from one or more first clusters of the plurality of computation clusters and for outputting output signals to one or more second clusters of the plurality of computation clusters via M data output ports, M>1, the method comprising:
  providing a segmented bus network for interconnecting clusters of the plurality; and
  activating, concurrently, P parallel data busses of the segmented bus network, thereby forming bidirectional parallel interconnection paths between P of the N data input ports, P<N, and P of the M data output ports, P<M, via segments of the segmented bus network,
  wherein the segments are linked by segmentation switches, and
  wherein the segmentation switches are implemented, at least partly, in a back-end-of-line (BEOL) fabric of at least one electronic integrated circuit wherein the plurality of computation clusters has been fabricated.

14. The method for operating the data communication network of claim 13, further comprising performing time-division multiplexing of concurrently required data interconnections of a profiled histogram, wherein a time multiplexing factor does not exceed a ratio of a realizable clock frequency of the BEOL fabric and a required data rate between data inputs and outputs of the plurality of computation clusters.

15. The method for operating the data communication network of claim 14, wherein the time-division multiplexing is organized according to a Local Parallel Global Sequential scheme.

16. The method for operating the data communication network of claim 13, further comprising determining the P from a profiled histogram of concurrently occurring inter-cluster connection patterns in at least one given application.

17. The method for operating the data communication network of claim 16, further comprising determining the P as a maximum number of concurrently required data interconnections of the inter-cluster connection patterns in the profiled histogram.

18. The method for operating the data communication network of claim 16,
   wherein a position matrix of the segmentation switches on the P parallel data busses is determined based on a top X % of a set of most likely concurrently occurring connection patterns in the profiled histogram, and
   wherein X is a user-defined threshold.

19. The method for operating the data communication network of claim 13, further comprising selecting the P parallel data busses among S busses of the segmented bus network by performing a pruning based on application profiling.

20. The method for operating the data communication network of claim 13, further comprising providing a backup of additional segmentation switches based on a maximal concurrent set of connection patterns starting from each of the N data input ports or ending in each of the M data output ports.

* * * * *